US012329163B2

(12) United States Patent
Mitlitski et al.

(10) Patent No.: US 12,329,163 B2
(45) Date of Patent: Jun. 17, 2025

(54) REPELLANT FORMULATION AND METHOD

(71) Applicant: Insight Pharmaceuticals Corporation, Tarrytown, NY (US)

(72) Inventors: Vadim Mitlitski, Demarest, NJ (US); Richard Robert Tenore, Narrowsburg, NY (US); Erica Rattigan Tyree, Amherst, VA (US)

(73) Assignee: Insight Pharmaceuticals Corporation, Tarrytown, NY (US)

( * ) Notice: Subject to any disclaimer, the term of this patent is extended or adjusted under 35 U.S.C. 154(b) by 0 days.

(21) Appl. No.: 18/073,535

(22) Filed: Dec. 1, 2022

(65) Prior Publication Data

US 2023/0090260 A1    Mar. 23, 2023

Related U.S. Application Data

(62) Division of application No. 17/217,967, filed on Mar. 30, 2021.

(60) Provisional application No. 63/078,059, filed on Sep. 14, 2020.

(51) Int. Cl.
| | |
|---|---|
| *A01N 25/04* | (2006.01) |
| *A01N 65/06* | (2009.01) |
| *A01N 65/08* | (2009.01) |
| *A01N 65/22* | (2009.01) |
| *A01N 65/24* | (2009.01) |
| *A01N 65/28* | (2009.01) |
| *A01N 65/42* | (2009.01) |
| *A01N 65/44* | (2009.01) |

(52) U.S. Cl.
CPC ............. *A01N 65/22* (2013.01); *A01N 25/04* (2013.01); *A01N 65/06* (2013.01); *A01N 65/08* (2013.01); *A01N 65/24* (2013.01); *A01N 65/28* (2013.01); *A01N 65/42* (2013.01); *A01N 65/44* (2013.01)

(58) Field of Classification Search
CPC ..................................................... A01N 25/04
See application file for complete search history.

(56) References Cited

U.S. PATENT DOCUMENTS

| | | | |
|---|---|---|---|
| 4,238,499 A | 12/1980 | Lover | |
| 4,356,180 A | 10/1982 | McGovern et al. | |
| 5,093,124 A | 3/1992 | Kulenkampff | |
| 5,292,504 A | 3/1994 | Cardin | |
| 5,518,736 A | 5/1996 | Magdassi et al. | |
| 5,610,130 A * | 3/1997 | Thomas | C11D 1/8305 510/501 |
| 5,614,558 A | 3/1997 | James et al. | |
| 5,696,158 A | 12/1997 | Oliver | |
| 5,736,584 A | 4/1998 | Kunkel et al. | |
| 5,885,600 A | 3/1999 | Blum et al. | |
| 5,902,595 A | 5/1999 | Burklow et al. | |
| 6,063,771 A | 5/2000 | Snyder | |
| 6,147,091 A | 11/2000 | Kruger et al. | |
| 6,207,179 B1 | 3/2001 | Mihalik | |
| 6,277,415 B1 | 8/2001 | Levin | |
| 6,538,027 B2 | 3/2003 | Manker et al. | |
| 6,544,530 B1 | 4/2003 | Friedman | |
| 6,607,716 B1 | 8/2003 | Smith et al. | |
| 6,663,876 B2 | 12/2003 | Campbell et al. | |
| 6,685,969 B2 | 2/2004 | Van Scoik et al. | |
| 6,727,228 B2 | 4/2004 | Janssen et al. | |
| 6,835,386 B2 | 12/2004 | Gutierrez | |
| 6,927,210 B1 | 8/2005 | Thompson et al. | |
| 6,936,269 B2 | 8/2005 | Robinson | |
| 7,232,844 B2 | 6/2007 | Hallahan | |
| 7,307,043 B2 | 12/2007 | Schlatter et al. | |
| 7,381,431 B2 | 6/2008 | Baker et al. | |
| 7,531,188 B2 | 5/2009 | Jones | |
| 7,579,017 B2 | 8/2009 | Murphy et al. | |
| 7,807,190 B2 | 10/2010 | Kinglsey | |
| 7,829,551 B2 | 11/2010 | Ansell | |
| 7,846,463 B2 | 12/2010 | Johal | |
| 7,846,464 B2 | 12/2010 | Darling | |
| 7,902,256 B2 | 3/2011 | Ping | |

(Continued)

FOREIGN PATENT DOCUMENTS

| | | |
|---|---|---|
| AU | 676219 | 6/1994 |
| CN | 1164322 | 11/1997 |

(Continued)

OTHER PUBLICATIONS

UL Prospector (https://www.ulprospector.com/en/na/PersonalCare/Detail/10811/330761/LEVENOL-HandB)., retrieved on Jun. 4, 2024. (Year: 2024).*
Mitlitski, Vadim; Final Office Action for U.S. Appl. No. 17/217,967, filed Mar. 30, 2021, mailed Aug. 29, 2023, 15 pgs.
Mitlitski, Vadim; Non-Final Office Action for U.S. Appl. No. 17/217,967, filed Mar. 30, 2021, mailed Jan. 20, 2023, 30 pgs.
Mitlitski, Vadim; Requirement for Restriction/Election for U.S. Appl. No. 17/217,967, filed Mar. 30, 2021, mailed Sep. 21, 2022, 9 pgs.
RO-128885-B1 translated doc (Year: 2017).
The VRG Group Blog (https://www.vrg.org/blog/2012/09/24/glycerol-and-mono-and-diglyceride-updates-mostly-vegetable-derived/) (Year: 2012).

(Continued)

*Primary Examiner* — Terry A McKelvey
*Assistant Examiner* — Jacob A Boeckelman
(74) *Attorney, Agent, or Firm* — Taylor English Duma LLP

(57) ABSTRACT

A formulation for repelling insects and arthropods comprises about 0.5% by weight to about 4.0% by weight of an active ingredient and an emulsifier. The active ingredient includes a mixture of one or more natural essential oils. A method for making the repellant formulation comprises forming an oil-in-water emulsion by mixing one or more of the natural essential oils into an aqueous solution including an emulsifier, homogenizing the oil-in-water emulsion, and adding a buffer to the emulsion for maintaining a pH of the emulsion at above about 7.5. The repellant formulation is used by applying an effective amount of the repellant formulation onto the skin or fur of a mammal, clothing or other surface.

3 Claims, No Drawings

(56) References Cited

U.S. PATENT DOCUMENTS

| | | | |
|---|---|---|---|
| 7,988,985 | B2 | 8/2011 | Bessette |
| 7,994,138 | B2 | 8/2011 | Awada et al. |
| 8,062,676 | B2 | 11/2011 | Besendorfer |
| 8,119,150 | B2 | 2/2012 | Tamarkin et al. |
| 8,142,801 | B2 | 3/2012 | Jones |
| 8,231,887 | B2 | 7/2012 | Sims |
| 8,563,018 | B2 | 10/2013 | Burke |
| 8,574,641 | B2 | 11/2013 | Pesso |
| 8,771,718 | B2 | 7/2014 | Scialdone et al. |
| 8,877,219 | B2 | 11/2014 | Bessette |
| 8,889,731 | B2 | 11/2014 | Gries et al. |
| 8,927,595 | B2 | 1/2015 | Spring et al. |
| 8,968,757 | B2 | 3/2015 | Man et al. |
| 9,055,745 | B2 | 6/2015 | James-Meyer et al. |
| 9,101,143 | B2 | 8/2015 | Shoham et al. |
| 9,173,403 | B2 | 11/2015 | Rosentel et al. |
| 9,326,524 | B1 | 5/2016 | Jack et al. |
| 9,403,995 | B2 | 8/2016 | Agrawal et al. |
| 9,468,207 | B2 | 10/2016 | Mateo Herrero |
| 9,642,373 | B2 | 5/2017 | Anderson |
| 9,955,695 | B2 | 5/2018 | Found |
| 9,999,227 | B2 | 6/2018 | Manhas et al. |
| 10,149,481 | B2 | 12/2018 | Bissinger et al. |
| 10,206,393 | B2 | 2/2019 | Goldblum et al. |
| 10,328,112 | B2 | 6/2019 | Hatten |
| 10,499,637 | B2 | 12/2019 | Mehlhorn et al. |
| 2001/0009925 | A1 | 7/2001 | Lambino et al. |
| 2003/0194454 | A1 | 10/2003 | Bessette et al. |
| 2004/0037904 | A1 | 2/2004 | Hakansson |
| 2004/0191290 | A1 | 9/2004 | Kelley |
| 2005/0112164 | A1 | 5/2005 | Lewey |
| 2006/0165748 | A1 | 7/2006 | Arimoto |
| 2006/0228387 | A1 | 10/2006 | Scialdone |
| 2007/0190094 | A1 | 8/2007 | Bessette |
| 2007/0264294 | A1 | 11/2007 | Lance-Gomez et al. |
| 2007/0264297 | A1 | 11/2007 | Scialdone et al. |
| 2008/0095813 | A1 | 4/2008 | Kiec |
| 2008/0193387 | A1 | 8/2008 | De Wolff |
| 2010/0197786 | A1 | 8/2010 | Elraz |
| 2010/0204277 | A1 | 8/2010 | Bowles et al. |
| 2010/0254928 | A1 | 10/2010 | Yamazaki et al. |
| 2012/0087987 | A1 | 4/2012 | Man et al. |
| 2012/0093949 | A1 | 4/2012 | Steinberg |
| 2012/0107428 | A1 | 5/2012 | Schneidmiller et al. |
| 2012/0164081 | A1* | 6/2012 | de Lame .............. A01N 65/08 424/45 |
| 2015/0133406 | A1 | 5/2015 | Bedoukian |
| 2015/0201615 | A1 | 7/2015 | Schmidt |
| 2015/0216182 | A1 | 8/2015 | Brown |
| 2016/0214974 | A1 | 7/2016 | Schaetzer et al. |
| 2017/0360825 | A1 | 12/2017 | Salamone et al. |
| 2018/0035674 | A1 | 2/2018 | Schmidt et al. |
| 2018/0168149 | A1 | 6/2018 | Jones |
| 2018/0213773 | A1 | 8/2018 | Bedoukian |
| 2018/0213774 | A1 | 8/2018 | Bedoukian |
| 2019/0091133 | A1 | 3/2019 | Hansen |
| 2019/0216086 | A1 | 7/2019 | Harding |
| 2019/0230930 | A1 | 8/2019 | Baba |
| 2019/0313636 | A1 | 10/2019 | Milbocker et al. |
| 2020/0093123 | A1 | 3/2020 | Bradbury et al. |
| 2022/0079166 | A1 | 3/2022 | Mitlitski et al. |
| 2023/0099513 | A1 | 3/2023 | Mitlitski et al. |

FOREIGN PATENT DOCUMENTS

| | | | |
|---|---|---|---|
| CN | 102626094 | 8/2012 | |
| CN | 104430580 | 3/2015 | |
| CN | 105724440 | 7/2016 | |
| CN | 108743946 | 11/2018 | |
| EP | 1435786 | 7/2004 | |
| EP | 1962587 | 9/2008 | |
| EP | 2081428 | 7/2009 | |
| EP | 2348832 | 8/2011 | |
| EP | 2470006 | 7/2012 | |
| EP | 3253206 | 12/2017 | |
| EP | 3457847 | 3/2019 | |
| FR | 2948261 | 1/2011 | |
| JP | 2002068917 | 3/2002 | |
| JP | 3405736 | 5/2003 | |
| JP | 4356006 | 11/2009 | |
| JP | 2012246273 | 12/2012 | |
| JP | 2020109078 | 7/2020 | |
| KR | 101034323 | 5/2011 | |
| RO | 128885 | 10/2017 | |
| RO | 128885 B1 * | 10/2017 | ............. A01N 25/28 |
| WO | 9108670 | 6/1991 | |
| WO | 2007085899 | 8/2007 | |
| WO | 2007093298 | 8/2007 | |
| WO | 2008101131 | 8/2008 | |
| WO | 2008124882 | 10/2008 | |
| WO | 2010134060 | 11/2010 | |
| WO | 2012059943 | 5/2012 | |
| WO | 2017151549 | 9/2017 | |
| WO | 2018050211 | 3/2018 | |
| WO | 2019008116 | 1/2019 | |
| WO | 2019150152 | 8/2019 | |

OTHER PUBLICATIONS

Mitlitski, Vadim; Non-Final Office Action for U.S. Appl. No. 18/073,538, filed Dec. 1, 2022, mailed Dec. 27, 2023, 32 pgs.

Mitlitski, Vadim; Advisory Action for U.S. Appl. No. 17/217,967, filed Mar. 30, 2021, mailed Mar. 27, 2024, 3 pgs.

Mitlitski, Vadim; Applicant-Initiated Interview Summary for U.S. Appl. No. 17/217,967, filed Mar. 30, 2021, mailed Nov. 5, 2024, 2 pgs.

Mitlitski, Vadim; Applicant-Initiated Interview Summary for U.S. Appl. No. 18/073,538, filed Dec. 1, 2022, mailed Nov. 5, 2024, 6 pgs.

Independent Chemical, Sodium Citrate's Commercial Applications, (https://independentchemical.com/blogs/sodium-citrate%E2%80%99s-commercial-applications-20050.aspx). Retrieved on Jul. 1, 2024. May 3, 2019. (Year: 2019).

Mitlitski, Vadim; Non-Final Office Action for U.S. Appl. No. 17/217,967, filed Mar. 30, 2021, mailed Jul. 18, 2024, 20 pgs.

Mitlitski, Vadim; Final Office Action for U.S. Appl. No. 18/073,538, filed Dec. 1, 2022, mailed Jul. 1, 2024, 14 pgs.

USDA Soap-Based Herbicides (https://www.ams.usda.gov/sites/default/files/media/Soaps%20H%20report%202015.pdf). Retrieved on Jul. 1, 2024. (Year: 2015).

Mitlitski, Vadim; Notice of Allowance for U.S. Appl. No. 17/217,967, filed Mar. 30, 2021, mailed Feb. 12, 2025, 18 pgs.

Mitlitski, Vadim; Notice of Allowance for U.S. Appl. No. 18/073,538, filed Dec. 1, 2022, mailed Apr. 15, 2025, 23 pgs.

* cited by examiner

REPELLANT FORMULATION AND METHOD

CROSS-REFERENCES

This application is a divisional application of U.S. application Ser. No. 17/217,967, filed Mar. 30, 2021, which claims the benefit of U.S. Provisional Application No. 63/078,059, filed Sep. 14, 2020, the contents of which are incorporated by reference herein in its entirety.

BACKGROUND

A repellant formulation and method are described and, more particularly, a repellant formulation for repelling insects and arthropods, including fleas, lice and ticks.

Various insects and arthropods are a nuisance and may pose a health risk to mammals, including humans and animals. The nuisance and risk factors may be reduced with the use of compositions consisting of repellants. Repellants are substances having a repelling effect on the insects or arthropods for keeping pests from flying or crawling near or on mammals. Repellant compositions can be used topically, in clothing, furniture, foodstuffs, or they can be used nearby humans or animals, such as in sprays.

Compositions derived from organic material, such as plant "essential oils", are known to have insect repellant or insecticide activity. Certain natural essential oils are listed as Minimal Risk Pesticides by the U.S. Environmental Protection Agency (EPA). Each of the essential oils listed by the EPA is an active ingredient known to repel or even kill fleas, lice and ticks in their pure form. Accordingly, any combination of these essential oils will also function effectively as a repellant; however, essential oils are hazardous materials when pure. Therefore, repellant compositions comprising essential oils must be formulated to safe concentration levels and convenient delivery forms. Repellents which are directly applied onto skin or fur must be well tolerated and non-toxic. Moreover, the repellant protection of the treated areas should last for the longest possible period of time.

Essential oils are also potent odiferous materials, any one oil individually is overpowering to the user's senses. Thus, a mixture of oils is necessary for a repellant formulation for both functional and aesthetic reasons. A blend of the oils is aesthetically more pleasing, and different blends can be tailored to differing tastes of the target customers for personal use or household use.

Another problem is essential oils do not blend well with water. The mixture of oils must be emulsified in water to attain a suitable commercial shelf life of two to three years. Generally, essential oil emulsions require a mixed emulsifier pair having a hydrophilic—lipophilic balance (HLB) above 10, typically 10-13, with stabilizers and thickeners to achieve kinetic stability.

For the foregoing reasons, there is a need for a long-lasting insect and arthropod repellent formulation including essential oils. The repellant formulation should have low toxicity, resistance to loss by water immersion or sweating, and pleasant odor. Ideally the repellant formulation will also offer ease of application, whether topically to skin or fur as well as on clothing or other surfaces.

SUMMARY

A formulation is provided for repelling insects and arthropods. The repellant formulation comprises about 0.5% by weight to about 4.0% by weight of an active ingredient and an emulsifier. The active ingredient includes a mixture of one or more natural essential oils and, in one embodiment, may comprise up to about 50% by weight of citronella oil and about 50% by weight of a second essential oil. In one aspect, the second essential oil is selected from cedarwood oil, cinnamon oil, clove oil, cornmint oil, eucalyptus oil, garlic oil, geranium oil, lemongrass oil, peppermint oil, rosemary oil, spearmint oil, thyme oil or combinations thereof. The one or more essential oils include isolates thereof, derivatives thereof or synthetic equivalents thereof.

The emulsifier is provided at a ratio of about 1:1 emulsifier to the one or more essential oils. In one embodiment, the emulsifier may comprise a mixture of two parts fatty acid soap and eight parts mono and di-glycerides. The soap may be selected from potassium soap, sodium soap, ammonium soap, monovalent salts of natural fatty acids or combinations thereof. The fatty acid may comprise a vegetable fat or an animal fat. In one embodiment, the fatty acid soap comprises potassium laurate. The potassium laurate is selected from purified or whole cut coconut fatty acid, palm kernel fatty acids or mixtures thereof.

The mono and di glycerides comprise a vegetable fat or an animal fat. In one aspect, the mono and di glycerides comprise glyceryl monooleate. In another aspect, the fatty acid soap comprises potassium laurate and the mono and di glycerides comprise glyceryl monooleate, and the ratios of potassium laurate to glyceryl monooleate are selected from 8:2, 7:3, 6:4, 5:5, 4:6 or 3:7. The mixed emulsifier pair may have a hydrophilic—lipophilic balance (HLB) below 10.

In yet another aspect, the repellant formulation may further comprise a humectant moisturizer. The moisturizer may be selected from sugars, short chain polyols and glycols. In one aspect, the short chain polyols and glycols are selected from dextran, glycerol, sorbitol, propylene or hexylene glycol. In one embodiment, the repellant formulation may comprise about 2% by weight to about 6% by weight of glycerol.

The repellant formulation has a pH of about 8 to about 9. The repellant formulation may comprise about 0.1% by weight to about 0.25% by weight of trisodium citrate as a buffer.

A method for making a formulation for repelling insects and arthropods is also provided. The method for making the repellant formulation comprises the steps of forming an oil-in-water emulsion by mixing one or more natural essential oils into an aqueous solution including an emulsifier, homogenizing the oil-in-water emulsion, and adding a buffer to the emulsion for maintaining a pH of the emulsion at above about 7.5.

In one aspect, the method for making the repellant formulation may further comprise the step of blending the one or more natural essential oils with warm glycerol monooleate before the step of forming the oil-in-water emulsion. In another aspect, the method may further comprise the step of preparing a 10% aqueous soap solution by mixing about 1.82% by weight of potassium hydroxide and about 8.76% by weight coconut or palm kernel fatty acid in warm water before the step of forming the oil-in-water emulsion. The step of adding the buffer comprises adding sodium citrate. In yet another aspect, the method of making may further comprise the step of adding glycerin to the oil-in-water emulsion before the homogenizing step.

A method for repelling insects and arthropods comprises the steps of providing a repellant formulation comprising about 0.5% by weight to about 4.0% by weight of an active ingredient, the active ingredient including a mixture of one or more natural essential oils, and an emulsifier. An effective amount of the repellant formulation is applied onto the skin or fur of a mammal, clothing or other surface. In certain aspects, the applying step may comprise spraying the repellant formulation, topical application of the repellant formulation, or dipping the surface into the repellant formulation.

DESCRIPTION

The term "active ingredient" as used herein is an ingredient in the formulation that is biologically active in repelling, preventing, destroying or otherwise mitigating a pest such as insects and arthropods, including fleas, lice and ticks. Active ingredient includes, but is not limited to all natural essential oils as well as all Active Ingredients Eligible for Minimum Risk Pesticide Products (Updated December 2015) as published by the United States Environmental Protection Agency as the list of active ingredients that can be used in pesticide products that are exempt from the Federal Insecticide, Fungicide, and Rodenticide Act (FIFRA) under the Minimum Risk Exemption regulations in 40 CFR 152.25(f).

The term "inert ingredient" as used herein means all other ingredients of the formulation other than an active ingredient. Inert ingredients include Inert Ingredients Eligible for FIFRA 25(b) Pesticide Products (Revised November 2016) as published by the United States Environmental Protection Agency as the inert ingredients that can be used in pesticide products that are exempt from Federal regulation under the Minimum Risk Exemption regulations in 40 CFR 152.25(f).

An embodiment of a repellant formulation comprises an active ingredient, including a mixture of one or more natural essential oils. In some embodiments, the composition comprises about 0.5 to about 4.0% by weight (w/w) of the active ingredient. The repellant formulation may further comprise an emulsifier and, optionally, dermatologically acceptable additives, carriers or diluents. In a particular embodiment, the repellant formulation may be formulated as an aqueous emulsion for application to hair, skin, clothing or other surfaces for repelling insects and arthropods, such as fleas, ticks and lice.

The active ingredient comprises a mixture of natural essential oils chosen from the essential oils on the EPA's list of Minimal Risk Pesticides. In one embodiment, the active ingredient mixture comprises up to about 50% citronella oil and the remaining 50% selected from the group of essential oils consisting of cedarwood oil, cinnamon oil, clove oil, cornmint oil, eucalyptus oil, garlic oil, geranium oil, lemongrass oil, peppermint oil, rosemary oil, spearmint oil, thyme oil or combinations thereof. The active ingredient may comprise the oils listed above, including certain isolates thereof, derivatives thereof, or the synthetic equivalent thereof.

The repellant formulation may comprise an emulsifier. The emulsifier may be provided at a ratio of about 1:1, emulsifier to essential oil mixture, for achieving a flowable, stable emulsion. We found the emulsion is kinetically stable, does cream slowly without coalescence and breakdown of the emulsion. Simple shaking of aged samples achieves uniformity. Homogenization of the emulsion is employed as a process step to ensure long term stability, no coalescence, for a commercial shelf life of greater than a year.

In one embodiment, the emulsifier comprises a mixture of two parts fatty acid soap and eight parts mono and di glycerides. The soap can be any number of fatty acid soaps when HLB is considered for emulsion stability. The soap can be selected from the group consisting of potassium, sodium or ammonium soaps, or monovalent salts of natural fatty acids. The fatty acid can be sourced from any number of vegetable or animal fat sources. A preferred soap is potassium laurate, which can be purified or whole cut coconut fatty acid or palm kernel fatty acids or mixtures. For spray application, a preferred soap is C12 lauric acid. For brush on application, C18 steric based sodium soaps are more appropriate. The mono and di glycerides can be sourced from any number of animal or vegetables fats. The mono and di glycerides can be produced either by direct esterification of glycerol with the fatty acid or interesterification between the natural triglyceride fat and glycerin. A preferred mono and di glyceride is glyceryl monooleate, the mono and diglyceride of oleic acid and glycerin, which is prone to making thinner emulsions when compared to glyceryl monostearate. The hydrophilic—lipophilic balance (HLB) of this mixture is about 6 to 7. The preferred emulsifier provides suitable kinetic stability with simple shaking. Other similar grade emulsifiers of identical or generally similar HLB may be used.

To find the optimum ratio of emulsifiers, mixtures of 2 ml of the essential oils listed above were mixed in test tubes with 8 ml water. The water contained 1% surfactant at varying ratios (9:1, 8:2, . . . 2:8, 1:9) of potassium laurate to glyceryl monooleate. The test tubes were shaken to mix and then set out overnight. In the first and last sample in this sequence, 9:1 and 1:9, the emulsion breaks up in minutes leaving clear water on the bottom of the test tube and a thick cream or clear oil on the top of the mixture. At the 2:8 ratio of potassium laurate to glyceryl monooleate, the emulsion creamed some after a day, but did not fully break up and was found to remix easily upon shaking. All of the other mixtures developed a clear water layer on the bottom of the test tube overnight.

The repellant formulation may further comprise a humectant moisturizer. A number of moisturizers are suitable for use in the formulation, including sugars, short chain polyols and glycols. The short chain polyols and glycols are preferred for their skin compatibility and depress the freezing point of the formulation. Dextran, glycerol, sorbitol, propylene or hexylene glycol are all suitable examples. In one embodiment, about 2 to about 6% w/w of glycerol is used, which also provides freeze thaw stability.

The repellant formulation does not utilize traditional preservatives yet maintains microbial effectiveness.

The repellant formulation has a pH of about 8 to about 9. Since the formulation tends to be basic, the pH can be adjusted using any suitable buffer. Trisodium citrate is preferred as a buffer to prevent the pH from dropping below 7.5 thereby stabilizing the soap and maintaining stability of the emulsion. Some downward drift in pH occurs as the repellant formulation ages. Other buffers are acceptable, as long as pH remains above 7.5.

Exemplary repellant formulations include, without limitation, the following.

TABLE 1

Repellant Formulation

| Ingredients | Weight % |
|---|---|
| Water | q.s. |
| Essential Oil | X |
| Soap | (0.18-0.22)X |
| Glyceryl Mono & Di Esters of Fatty Acid | (0.78-0.82)X |

TABLE 1-continued

Repellant Formulation

| Ingredients | Weight % |
| --- | --- |
| Trisodium Citrate Dihydrate | 0.10-0.25 |
| Glycerol | 2.00-6.00 | where X = 0.50%-4.00%

TABLE 2

Repellant Formulation including Essential Oils

| Ingredients | Weight % |
| --- | --- |
| Purified Water | 94.60-78.55 |
| Soap 10% in purified water | 2.00-8.00 |
| Glyceryl Monooleate | 0.80-3.20 |
| Trisodium Citrate Dihydrate | 0.10-0.25 |
| Glycerol | 2.00-6.00 |
| Citronella Oil | 0.00-4.00 |
| Cedarwood oil | 0.00-4.00 |
| Cinnamon oil | 0.00-4.00 |
| Clove Oil | 0.00-4.00 |
| Cornmint Oil | 0.00-4.00 |
| Garlic Oil | 0.00-4.00 |
| Geranium Oil | 0.00-4.00 |
| Lemongrass Oil | 0.00-4.00 |
| Peppermint Oil | 0.00-4.00 |
| Rosemary Oil | 0.00-4.00 |
| Spearmint Oil | 0.00-4.00 |
| Thyme Oil | 0.00-4.00 |

An embodiment of a process for preparing an aqueous emulsion of the repellant formulation comprises the steps of (a) forming an oil-in-water emulsion by mixing the active ingredient into an aqueous solution containing an emulsifier; and (b) homogenizing the mixture obtained in (a) to give a stable emulsion, and adding to the emulsion obtained in (b) a buffer which is capable of increasing the pH of the solution for maintaining a pH above 7.5.

A method of repelling insects is also contemplated, the method comprising applying to a mammal, human or animal, an effective amount of the repellant formulations described herein, onto the skin or fur of the mammal as well as on clothing or other surfaces.

The repellant formulation has low viscosity for use as either a dip or a spray for personal use on hair or skin, fur, clothing or other surfaces. Spraying is sufficient because a light surface coating is all that is required for the repellant effect. Spraying on shoes and socks, as well the lower legs will repel ticks when walking in the outdoors. The repellant may also be applied directly to children's hair to repel head lice. A light spray coating on pet fur helps to repel fleas and ticks. The low viscosity profile of the material allows the emulsion to be used in an essential oil diffuser, vaporizing scent into the air.

Alternatively, dipping clothing to be worn by the user, such as scarves or head bands, or direct manual application with a brush on surfaces is also suitable. In the case of pests like bed bugs, the emulsion can be brushed on seams and edges of mattresses or fitted sheets.

Example 1

By way of example to further describe embodiments of the repellant formulation disclosed herein, and not intending to be limited hereby, embodiment of the repellant formulation are further exemplified below. All stated concentrations below are approximate weight percent. The following examples are illustrative of various embodiments only and do not limit the formulations regarding the materials, conditions, weight ratios, process parameters and the like recited herein.

The sample repellant formulations comprising stable fluid emulsions are made by preparing a 10% soap solution consisting of mixing 1.82 weight percent of potassium hydroxide and 8.76 weight percent coconut or palm kernel fatty acid in warm water until milky white and uniform. A premix of essential oils are by blending the essential oils with warm glycerol monooleate. Sodium citrate buffer, the 10% soap solution, glycerin and the essential oil premix are then combined with water. The mixture is run through a homogenizer prior to packaging to ensure uniformity and shelf life. The finished repellent has the consistency and appearance of milk. The emulsion is thin and suitable for use as a spray-on repellent. Slight creaming is not detrimental to use. Consumers frequently shake spray bottles or aerosols before use and labeling enforces this behavior. Other suitable forms of the repellant formulation could be gels for leave-on or spreadable repellents. Suitable inert ingredients as optional additives include polymeric water-soluble thickeners, gums and colloidal clays.

To evaluate efficacy of the repellant formulation, repellency was tested using lice collected from human hair. Hair tresses were placed in separate 9 dram plastic vial test containers. Each vial contained 3 mL of either the repellent formulation or water control. The hair tresses were removed from the vials after seven seconds. The wet tresses were placed on a cheese cloth to remove excess liquid. After approximately seven seconds on the cheese cloth, the prepared hair tresses were placed into Petri dishes lined with cheese cloth. A hair tress wetted with the repellant formulation was placed on one side of a center line, side B, and the negative control tress wetted with water was placed the same distance from the center line on the other side, side A. After both treated hair tresses were placed into the Petri dish, 25 lice were placed in the center of the Petri dish and allowed to roam freely between the hair tresses. The lice were observed and information recorded every five minutes for one hour. The effectiveness of the repellent formulation was assessed by counting at each observation point the number of active lice remaining on the negative, side B, of the dish with the repellant formulation-treated tress.

To evaluate potential of embodiments of the repellent formulation to induce skin irritation, samples of the repellant formulation were topically applied on a human three-dimensional epidermal model (EpiDerm™) in an in vitro skin irritation test. The test is based on the experience that irritant chemicals show cytotoxic effects following short term exposure to the stratum corneum of the epidermis. The test is designed to predict and classify the skin irritation potential of a sample by assessment of its effect on a three-dimensional human epidermis model.

The possible irritation potential of the sample was tested through topical application of the sample on the skin tissue for 60 minutes. After exposure, the skin tissue is thoroughly rinsed to remove the test sample and transferred to fresh medium. After a 42-hour incubation period, determination of the cytotoxic (irritancy) effect is performed.

Cytotoxicity is expressed as the reduction of mitochondrial dehydrogenase activity measured by formazan production from 3-(4,5-dimethylthiazol-2-yl)-2,5-diphenyl tetrazolium bromide (MTT) at the end of the test period.

Tissue viability was calculated for each piece of tissue as a percentage of the mean of the negative control tissues. Skin irritation potential of the test sample was classified according to remaining cell viability following exposure of the test article. To calculate tissue viability, Optical Density (OD) readings were transferred into Microsoft Excel to allow further calculations to be performed. The corrected OD ($OD_c$) for each sample or control were calculated by subtracting the value of the blank mean ($OD_{bl}$) from each reading ($OD_{raw}$).

$$OD_c = OD_{raw} - OD_{bl}$$

The OD value representing 100% cell viability is the average OD of the negative controls ($OD_{lt\_u+mTT}$).

The % Viability for each sample and positive control is calculated as follows:

$$\% \text{ Viability} = (OD_c / \text{mean } OD_{lt\_u+mTT}) * 100.$$

TABLE 3

Data interpretation of test articles

| Relative mean viability of 3 individual tissues after 60 minutes of exposure and 42 hours of post incubation | Prediction to be considered |
|---|---|
| ≤50% of the mean viability of the negative controls | Requires Classification (Category 1 or Category 2) (additional information on corrosion needed) |
| ≤50% of the mean viability of the negative controls | No Category |

TABLE 4

Example 1 Formulations

| | Weight % | | | | | | | | | |
|---|---|---|---|---|---|---|---|---|---|---|
| | 1 | 2 | 3 | 4 | 5 | 6 | 7 | 8 | 9 | 10 |
| Ingredient | RDLN516-16 | RDLN519-25 | RDLN519-18 | RDLN519-19 | RDLN519-20 | RDLN519-24 | RDLN519-26 | RDLN519-27 | RDLN519-22 | RDLN519-25 |
| Purified Water | 95.520 | 94.000 | 92.100 | 92.100 | 88.300 | 88.300 | 88.300 | 83.705 | 89.200 | 80.700 |
| Potassium Laurate (10%) | 0.200 | 1.000 | 2.000 | 2.000 | 4.000 | 4.000 | 4.000 | 8.000 | 4.000 | 8.000 |
| Glyceryl Monooleate | 0.080 | 0.400 | 0.800 | 0.800 | 1.600 | 1.600 | 1.600 | 3.200 | 1.600 | 3.200 |
| Trisodium Citrate Dihydrate | 0.100 | 0.100 | 0.100 | 0.100 | 0.100 | 0.100 | 0.100 | 0.100 | 0.100 | 0.100 |
| Glycerol | 4.000 | 4.000 | 4.000 | 4.000 | 4.000 | 4.000 | 4.000 | 4.000 | 4.000 | 4.000 |
| Citronella Oil | 0.100 | | 0.500 | 0.500 | 1.000 | | 1.000 | 0.500 | | 4.000 |
| Cedarwood oil | | | 0.200 | 0.200 | | 0.100 | 0.200 | 0.045 | 0.100 | |
| Cinnamon oil | | | | | | 0.100 | 0.200 | 0.045 | 0.100 | |
| Clove Oil | | | | 0.200 | | | 0.200 | 0.045 | | |
| Cornmint Oil | | | | 0.100 | | | | 0.045 | | |
| Garlic Oil | | | | | | | | 0.045 | | |
| Geranium Oil | | 0.500 | | | 0.500 | 1.000 | | 0.045 | 0.100 | |
| Lemongrass Oil | | | | | 0.200 | 0.400 | | 0.045 | | 0.400 |
| Peppermint Oil | | | | | 0.200 | 0.200 | | 0.045 | | 0.200 |
| Rosemary Oil | | | | | 0.100 | | 0.200 | 0.045 | | |
| Spearmint Oil | | | | | | 0.200 | | 0.045 | | 0.200 |
| Thyme Oil | | | 0.300 | | | | 0.200 | 0.045 | | |
| Repellency Efficacy, % | 57 | 85 | 84 | 92 | 87 | 93 | 73 | 89 | 80 | 92 |
| Skin irritation | Not tested | Non-irritant | Not tested | Non-irritant | Non-irritant | Not tested | Not tested | Not tested | Not tested | Irritant |

A repellant formulation sample is considered an irritant in the in vitro skin irritation test if the relative mean tissue viability of three individual tissue pieces after 60 minutes of exposure to the test sample and 42 hours of post incubation is <50% of the mean viability of the negative controls.

A repellant formulation sample is considered a non-irritant in the in vitro skin irritation test if the relative mean tissue viability of three individual tissues after 60 minutes of exposure to the test article and 42 hours of post incubation is >50% of the mean viability of the negative controls. Table 3 presents the data interpretation of test articles.

Sample 2 (lot number RDLN519-25), Sample 5 (lot number RDLN519-20), and Sample 4 (lot number RDLN519-19) are classified as non-irritants (No Category) as tested under the experimental conditions described herein. Sample 10 (lot number RDLN519-280) is classified as a skin irritant (Requires Classification) as tested under the experimental conditions described herein.

The repellant formulation provides a natural remedy with better olfactory aesthetics than synthetic pesticides. The repellant formulation has excellent repelling effect with minimal toxicological and irritative risk for use on mammals. The preferred repellant formulation also has a long lasting pleasant odor and may be considered aesthetically acceptable. Moreover, it is understood that some combinations of essential oils can cover malodors when used to repel pests from animal bedding or sprayed on plants to repel fleas and ticks.

We claim:

1. A method for making a formulation for repelling insects and arthropods, the method for making the repellant formulation consisting essentially of the steps of:
    forming an oil-in-water emulsion by mixing
        an aqueous solution including an emulsifier comprising a mixture of two parts fatty acid soap and eight parts mono and di-glycerides, wherein the mixed emulsifier has a hydrophilic-lipophilic balance (HLB) between about 5 and about 7, and
        about 0.5% by weight to about 4.0% by weight of an active ingredient, the active ingredient including a mixture of one or more natural essential oils, wherein fine droplets of the active ingredient are freely dispersed within the emulsifier forming the emulsion;
    homogenizing the oil-in-water emulsion; and
    adding a buffer to the emulsion for maintaining a pH of the emulsion at above about 7.5.

2. The method for making the repellant formulation as recited in claim 1, wherein the step of preparing the aqueous solution comprises, mixing about 1.82% by weight of potassium hydroxide and about 8.76% by weight coconut or palm kernel fatty acid in warm water before the step of forming the oil-in-water emulsion.

3. The method for making the repellant formulation as recited in claim 1, wherein the step of adding the buffer comprises adding sodium citrate.

* * * * *